United States Patent [19]
Shindo et al.

[11] 3,918,892
[45] Nov. 11, 1975

[54] APPARATUS FOR HEATING A PIPE MADE OF A THERMOPLASTIC SYNTHETIC RESINOUS MATERIAL

[75] Inventors: Masatoshi Shindo, Otake; Shiro Tsuchiya; Kazuo Takegami, both of Osaka, all of Japan

[73] Assignees: Mitsui Petrochemical Industries, Ltd., Tokyo; Hitachi Shipbuilding and Engineering Co., Ltd., Osaka, both of Japan

[22] Filed: Sept. 23, 1974

[21] Appl. No.: 508,561

[30] Foreign Application Priority Data
Sept. 25, 1973 Japan............................ 48-106894
Dec. 6, 1973 Japan............................ 48-135736

[52] U.S. Cl.................................. 432/36; 432/59
[51] Int. Cl.²....................... F27B 1/26; F27B 9/28
[58] Field of Search............ 432/8, 36, 59; 236/15 B

[56] References Cited
UNITED STATES PATENTS
2,089,029  8/1937  Jones.................... 236/15 B
3,677,530  7/1972  MacDuff.................. 432/59

Primary Examiner—John J. Camby
Attorney, Agent, or Firm—James E. Nilles

[57] ABSTRACT

This invention relates to an apparatus for heating a pipe made of a thermoplastic synthetic resinous material.

Said apparatus comprises a heating chamber defined between an inner tubular member and an outer tubular member for heating the crystalline thermoplastic resinous pipe moving through the central portion of said inner tubular member, a plurality of partition walls extending through the entire length of said heating chamber to divide the heating chamber into a plurality of chamber portions, and a plurality of temperature measuring elements.

Each element is mounted in one of said plurality of chamber portions and angularly displaced from one another circumferentially whereby each said temperature measuring element can effect control of the temperature in one of the chamber portions independently of one another.

7 Claims, 15 Drawing Figures

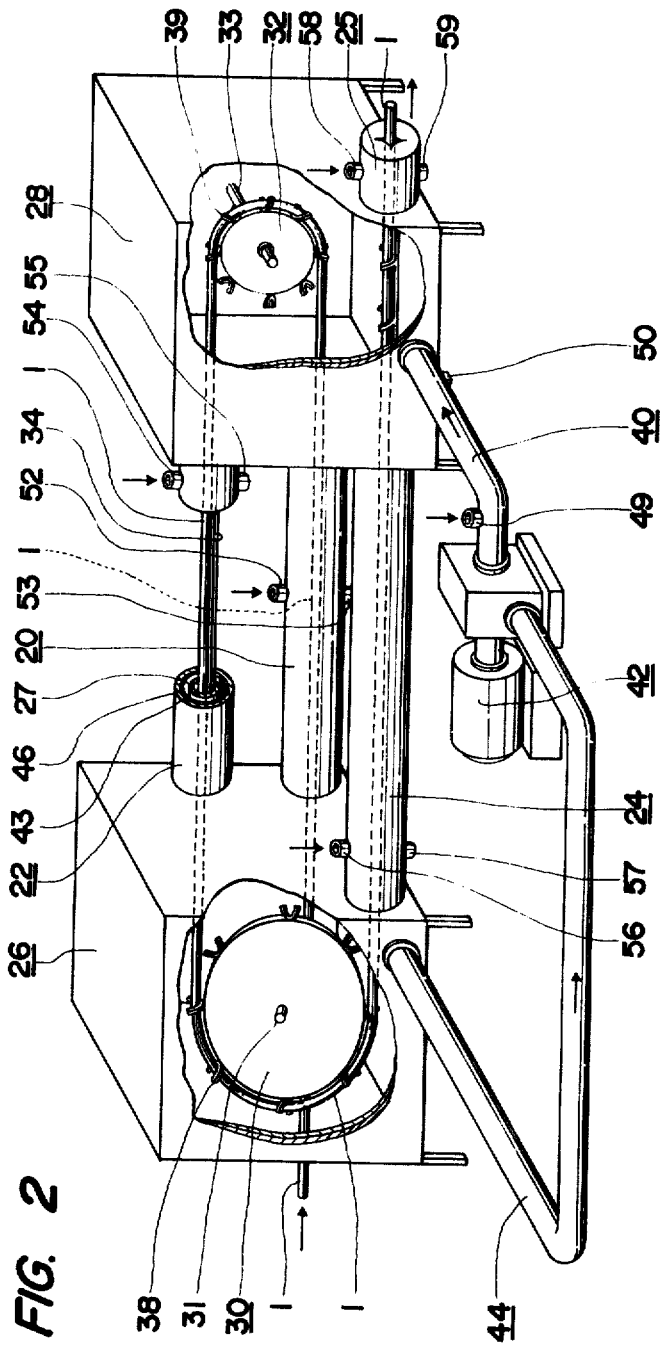
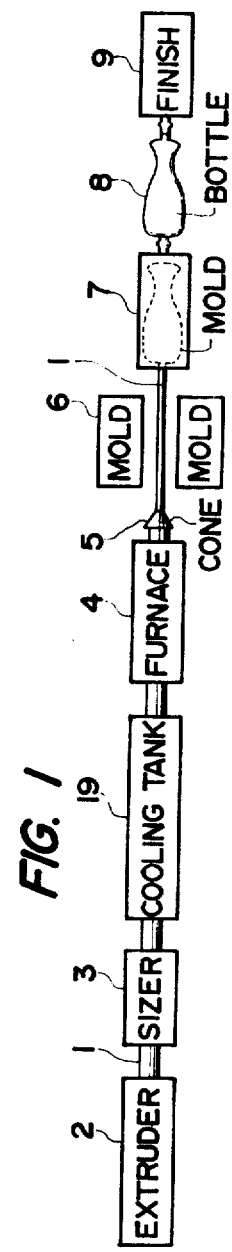

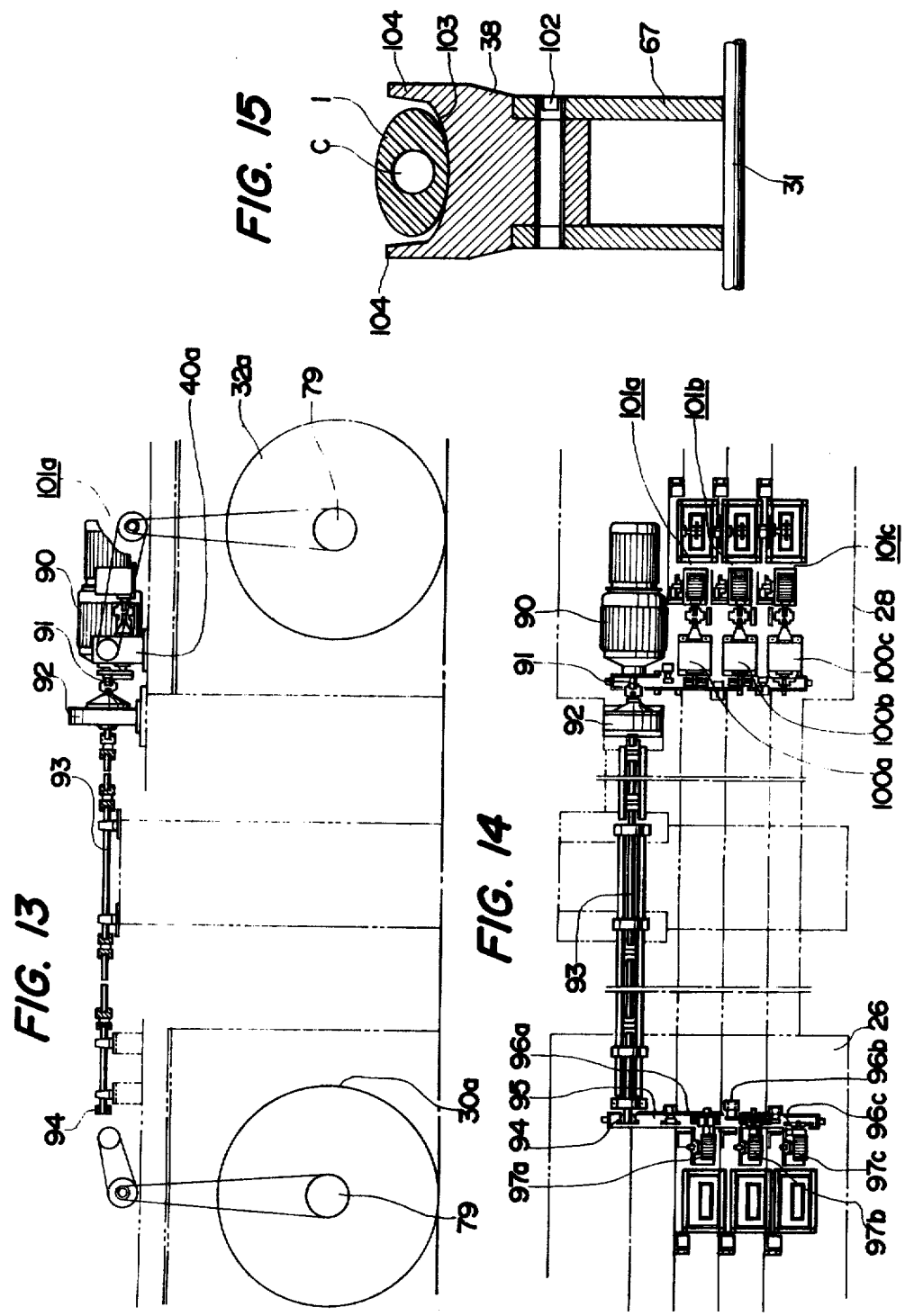

APPARATUS FOR HEATING A PIPE MADE OF A THERMOPLASTIC SYNTHETIC RESINOUS MATERIAL

BACKGROUND OF THE INVENTION

This invention relates to apparatus for continuously heating a cooled pipe made of a thermoplastic synthetic resinous material to produce hollow products, and more particularly it is concerned with a heating apparatus for a biaxial elongation blow molding apparatus for producing hollow products of a thermoplastic resinous material in which a resinous pipe is heated to an elongation temperature and elongated in an axial direction and elongated in a radial direction by expanding in a metallic mold so as to produce products of the desired shape.

In this type of apparatus hitherto used for heating a resinous pipe, the resinous pipe is heated in a heating furnace to a temperature slightly below the melting point of the crystals. The heating apparatus comprises a heating chamber defined between an outer tubular member surrounded by a heat insulating material at its outside and an inner tubular member arranged concentrically with the outer tubular member, and a heating fluid, e.g., steam, is supplied to the heating chamber. Suitable guide means are provided on the inner side of the inner tubular member so as to guide the pipe of a thermoplastic resinous material to be heated. Thus, the resinous pipe absorbs heat from the heating chamber and is heated to a predetermined temperature while being guided by the guide means to move in an axial direction. Temperature control means are provided for maintaining the temperature in the heating chamber at a predetermined level. Actually, however, it is difficult to evenly heat the resinous pipe, and various points on the circumference of the resinous pipe show diffrent temperatures in many cases.

The cause of this phenomenon has not been established yet. It is presumed, however, that disturbance of radiation heat by the guide means or uneven flow of the air in the inner tubular member is responsible for the phenomenon. The results of experiments show that the temperature of the resinous pipe is generally lower at its lower side than the other sides. If the temperature of the resinous pipe is not uniform throughout its entire extent and circumference, it is not possible to carry out blow molding satisfactorily and the hollow products produced have defects.

In this type of apparatus for heating a resinous pipe, it takes a considerably long time to evenly heat the resinous pipe as a whole to its elongation temperature when the hollow products to be produced are large in size, because the thickness of the resinous pipe is increased. On the other hand, the speed at which the resinous pipe is fed tends to increase as the advances are made in the speed of blow molding. Thus, when it is desired to produce hollow products of a large size at high speed on a mass production basis, it is necessary to increase the size of the heating furnace for the resinous pipe. This inevitably requires a larger space for the blow molding plant.

It is not advantageous to use an elongated and large heating furnace. It will be evident that it is possible to reduce the length of the heating furnace if the resinous pipe is made to change its direction of movement by 180° by using at least two pipe guide wheels and to move in reciprocatory movement in the heating furnace. We have already made a proposal to use such heating furnace which will be outlined below. A pipe made of a synthetic resinous material is introduced into an inlet chamber from which it moves through an inner tubular member of a double tube conduit to the pipe guide wheel mounted in an outlet chamber which guides the pipe and causes the same to change its direction of movement by 180°. The pipe then moves through an inner tubular member of another double conduit and returns to the inlet chamber where it is made to change the direction of its movement by 180° by another pipe guide wheel and move through an inner tubular member of another double tube conduit to the outlet chamber from which it is led to the outside. The resinous pipe moves through the interior of the inner tubular member while being held by the guide means. A stream of heating medium, e.g., steam, circulates at low speed through a space between the inner tubular member and the outer tubular member of each conduit to heat the pipe. On the other hand, air is supplied by a blower to circulate through the inner tubular member.

The resinous pipe is subjected to radiation heat produced by the heating steam and heat of the circulating air stream, so that the pipe can be heated. This heating apparatus can perform a heating operation effectively, with temperature control being effected readily and no more space than is necessary is required. However, this heating apparatus has a disadvantage in that the resinous pipe receives undesirable tension when the direction of its movement is reversed by the pipe guide wheel, so that the pipe is periodically twisted and substantially makes one revolution in two directions about its longitudinal axis or the pipe tends to narrow or loosen. As a result, various portions of the pipe become uneven in the elongation operation and the blow molding operation following the heating operation. This makes it impossible to obtain final hollow products of high quality.

Moreover, in the heating apparatus in which the resinous pipe is made to move in reciprocatory movement in the heating furnace by using the pipe guide wheels to change the direction of movement of the pipe by 180°, thermal expansion occurs in the resinous pipe heated in the heating furnace as its temperature rises and the pipe tends to loosen as its length gradually increases. When a force is exerted on the pipe, its thickness is reduced as it is elongated, thereby causing a change in the diameter or thickness of the pipe. This makes it necessary to increase the number of revolutions of the pipe guide wheels. To this end, it is necessary to provide each pipe guide wheel with a speed changing means for fine adjustment of the number of revolutions. This increases cost and makes it difficult to adjust the number of revolutions of the pipe guide wheels in the molding operation.

SUMMARY OF THE INVENTION

An object of the invention is to provide a pipe heating apparatus which makes it possible to evenly heat the circumference of a resinous pipe as the pipe moves axially thereof in the central portion of a pipe heating apparatus comprising an inner tubular member and an outer tubular member.

Another object of the invention is to provide a pipe heating apparatus which comprises at least two partition walls extending along the entire length of the longitudinal axial extent of a heating chamber defined between the inner tubular member and the outer tubular member, so that the heating chamber is divided into a plurality of chamber portions by such partition walls. A heating medium supply pipe and a heating medium discharge pipe are connected to each chamber portion, so that the temperature of each chamber portion can be controlled independently.

Still another object of the invention is to provide a pipe heating apparatus in which differences in the temperature of various portions of a resinous pipe on its circumference can be eliminated as the pipe moves through the pipe heating apparatus by partitioning a heating chamber into a plurality of chamber portions and by effecting temperature control of each chamber portion independently, so that the pipe can be heated evenly. This makes it possible to produce from the pipe hollow products which are uniform in thickness and highly transparent.

Still another object of the invention is to provide an apparatus for continuously heating a pipe made of a thermoplastic synthetic resinous material which can eliminate narrowing, loosing or twisting of the pipe as it is heated to an elongation temperature when the pipe made of a thermoplastic synthetic resinous material is extruded in the form of a pipe from the extruder, cooled, heated again to elongate the same, and then subjected to blow molding to produce hollow products, e.g., bottles.

Still another object of the invention is to provide a pipe heating apparatus which enables the pipe to be formed elliptically or circular in crosssection and which can be kept from rotating about the longitudinal axis of the pipe by the pipe guide wheels. Thus, the pipe produced is free from twisting and homogeneous when heated to its elongation temperature.

Still another object of the invention is to provide a pipe heating apparatus which enables production of final products of substantially uniform thickness when the final products are hollow articles elliptic in crossection or flat bottles, for example, produced by blow molding, because the pipe itself is elliptic in form.

Still another object of the invention is to provide a drive mechanism for the drum for conveying the pipe adapted for use in an apparatus for continuously heating a pipe made of a crystalline thermoplastic synthetic resinous material used for producing hollow articles.

Still another object of the invention is to provide a simple drum drive mechanism for the thermoplastic resinous pipe which can eliminate loosening of the pipe when the pipe is guided by the pipe guide wheels in a pipe heating apparatus.

A further object of the invention is to provide a pipe heating apparatus comprising a plurality of pipe guide wheels disposed on opposite sides of the heating furnace, the pipe guide wheels guiding the pipe which moves upwardly from its lower run to its upper run being forcedly driven and the pipe guide wheels guiding the pipe which moves downwardly from its upper run to its lower run being driven by the pipe so that loosening or deformation of the pipe can be prevented.

By using the pipe heating apparatus according to the invention, a pipe made of any thermoplastic resinous material can be heated. The invention has particular utility in a pipe made of a solid polymer of highly crystalline mono-α-olefins having up to 6 carbon numbers, for example ethylene polymers of high density, isotactic polypropylene, poly-4-methyl-1-pentene, polybutene-1 and the like.

BRIEF DESCRIPTION OF THE DRAWINGS

FIG. 1 is a process flow diagram showing the steps of producing final products;

FIG. 2 is a perspective view of the heating furnace including partial break-away views thereof incorporating the invention therein;

FIG. 13 is a side view of the drum rotating device incorporating the invention therein;

FIG. 14 is a plan view of FIG. 13; and

FIG. 15 shows a thermoplastic resinous pipe in cross-section.

DESCRIPTION OF EMBODIMENTS

Figure 3:
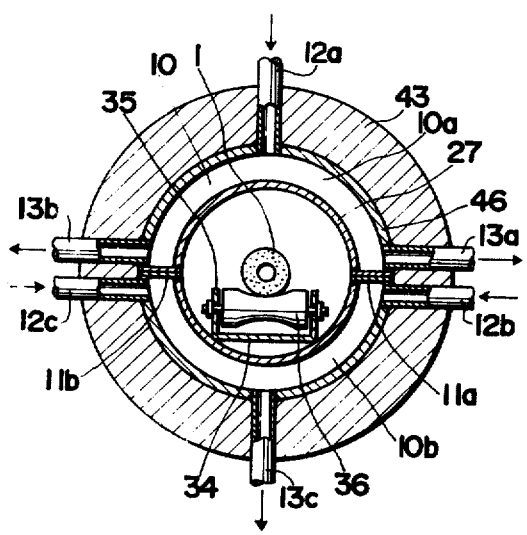
FIG. 3 to FIG. 6 are sectional views showing different embodiments of the heating apparatus according to the invention.

Referring to FIG. 1, an extruder 2 is employed to extrude a polypropylene pipe 1. The pipe 1 is passed through a sizer 3 to a cooling tank 19 where it is cooled below the crystalline temperature. If the pipe 1 is made of polypropylene, crystallization can be expedited by heating the pipe to about 120°C. Suitable drive means (not shown) is used to move the pipe 1 from the extruder 2 to the sizer 3 and cooling tank 19.

After being heated again at a heating furnace 4 to a temperature which is slightly lower than its crystalline melting point (about 140° to 167°C in case of polypropylene pipe), the pipe 1 is supplied through a draw cone 5 to a pair of mold members 6 and 7. The mold members 6 and 7 which alternately grip the pipe 1 and move away from the heating furnace 4 the same through the cone 5 to orient the pipe 1. The mold member 6 grips the pipe 1 and moves away the same from the heating furnace 4 to stretch and orient the pipe 1. While the pipe 1 is being elongated by the mold member 6, the other mold member 7 remains in an open position and moves toward the heating furnace 4 and stops adjacent the elongated pipe 1 and closes on the pipe 1 to grip the same and moves away from the heating furnace 4 to stretch a new portion of the pipe 1 emerging from the heating furnace 4.

After the mold member 7 closes and is moving away from the heating furnace 4, the mold member 6 which has previously gripped the pipe 1 and moved in a direction in which it moves away from the heating furnace 4 opens to release a bottle 8 made from the pipe 1 in the mold member 6. Thereafter, the mold member 6 moves toward the heating furnace 4 to repeat the aforementioned cycle. The mold members 6 and 7 are each connected to a pressure source which supplies pressure to the mold members 6 and 7 to expand the pipe 1 to form the bottle 8. The bottle 8 thus formed is moved to a final finishing position 9 where it is separated from the other bottles flash removed, neck of the bottle trimmed and bored to final size.

This invention relates to the art for reheating the pipe 1 in the heating furnace 4. The heating furnace 4 will now be described in detail, and the description of other parts shall be omitted because they are known.

Referring to FIG. 2, three conduits generally designated by reference numeral 20, 22 and 24 each open at one end in an inlet chamber 26 and at the other end in an outlet chamber 28. A conduit 25 is connected to the outlet chamber 28 on a side thereof opposite the conduit 24. Each conduit includes an inner tubular member 27 disposed therein through which the pipe 1 moves. A pipe guide wheel 30 is rotatably mounted on a shaft 31 and disposed in the inlet chamber 26 while another pipe guide wheel 32 is rotatably mounted on a shaft 33 and disposed in the outlet chamber 28. A guide means 34 extends the length of the pipe 1 and has a large number of guide rollers 36 spaced apart from one another a suitable distance and mounted by some known means on the guide means 34 through suitable supporters 35 as shown in FIG. 3.

The guide wheel 30 in the inlet chamber 26 is inclined through an angle such that a plurality of pipe guide members 38 provided on the outer periphery of the guide wheel 30 are disposed substantially in the same plane as the guide means 34 disposed in the conduits 22 and 24. The inlet chamber 26 is formed at its front wall with an opening which is aligned with the conduit 20 for introducing the pipe 1 into the conduit 20 through the inlet chamber 26. The guide wheel 32 in the outlet chamber 28 is disposed in a vertical plane and has on its outer periphery a plurality of pipe guide members 39 which are substantially in the same vertical plane as the guide means 34 in the conduits 20 and 22.

The guide members 38, 39 may be made of any material. However, they should be made of a material whose frictional resistance to the movement of the pipe 1 can be minimized in order that the pipe 1 may not be elongated. Moreover, the material for producing the guide members 38, 39 should be low in thermal conductivity so as not to absorb heat from the pipe 1 when the latter moves on the former. It goes without saying that the melting point of the guide members 38, 39 should be higher than that of the pipe 1. When the pipe 1 is made of polypropylene, polytetrafluoroethylene is a suitable material for the guide members 38, 39. Other materials, such as polychlorotrifluoroethylene, polyvinylidene fluoride and fluorinated ethylene-propylene copolymer plastics, may be used to produce the guide members 38, 39.

An air heating duct 40 is connected at one end to a blower 42 at its exhaust side and at the other end to the outlet chamber 28. The other end of the air heating duct 40 opens in the outlet chamber 28 in a position in which the open end of the duct 40 is disposed adjacent the path of movement of the pipe 1 from the conduit 24 to the outlet conduit 25. This ensures that, when the pipe 1 is at a temperature which is below the desired level, the pipe 1 absorbs heat at this point by being exposed to the maximum air temperature immediately before being elongated. An air return duct 44 is connected at one end to the blower 42 at its intake side and at the other end to the inlet chamber 26.

The conduits 20, 22, 24 and 25 and the air heating duct 40 each comprise an inner tubular member 27 and an outer tubular member 46, the outer tubular member 46 surrounding the inner tubular member 27 and defining therebetween s steam jacket or a heating chamber 10. The inlet and outlet chambers 26, 28, conduits 20, 22, and 24, air heating duct 40 and air return duct 44 are each covered with an insulating material layer 43, thereby precluding heat loss. The air supplied by the blower 42 is first sent to the outlet chamber 28 from which it passes through the conduits 20, 22 and 24 and moves into the inlet chamber 26 from which it is returned to the blower 42 through the air return duct 44. The air from the blower 42 circulates through the heating furnace 4 at a speed such that it moves in a turbulent flow.

A steam generator (not shown) supplies steam to the ducts 40, 44 and conduits 20, 22, 24 and 25. The steam generator is maintained in communication, through pressure regulating means (not shown) and inlet ports 52, 54, 56 and 58 formed in the conduits 20, 22, 24 and 25 respectively, with the heating chamber 10 interposed between the outer tubular member 46 and the inner tubular member 27 of each conduit. The conduits 20, 22, 24 and 25 are also formed with outlet ports 53, 55, 57 and 59 respectively which is connected to the heating chamber 10 of each conduit.

The steam generator is maintained in communication, through an inlet port 49 formed in the air supply duct 40, with the heating chamber 10 interposed between the inner tubular member 27 and the outer tubular member 46 of the air supply duct 40. The heating chamber 10 is connected to an opening port 50 formed in the air supply duct 40.

In operation, the pipe 1 which has undergone crystal formation is introduced into the inlet chamber 26 where it slides on the guide means 34 in the conduit 20 till it reaches the guide wheel 32. The pipe 1 is wound on the guide wheel 32 and guided by the guide members 39. Then, the pipe 1 is introduced into the conduit 22 where it slides on the guide means 34 till it reaches the guide wheel 30. The pipe 1 is wound on the guide wheel 30 and guided by the guide members 38. Thereafter, the pipe 1 is introduced into the conduit 24 where it slides on the guide means 34, moves through the outlet chamber 28 and finally is introduced into the outlet conduit 25. The pipe 1 is moved through the heating furnace 4 by a force which is produced when the molding members 6 and 7 move. The entire outer surface of the pipe 1 is exposed to the stream of circulating air at all times.

The conduits 20, 22 and 24 will now be described in detail. Referring to FIG. 3 which shows one embodiment, the heating chamber 10 defined between the inner tubular member 27 and the outer tubular member 46 is divided into an upper chamber portion 10a and a lower chamber portion 10b by partition walls 11a and 11b extending through the entire length of the heating chamber 10. The upper chamber portion 10a is maintained in communication with a supply pipe 12a through the inlet port 52, 54 or 56, and with exhaust pipes 13a and 13b. The lower chamber portion 10b is maintained in communication with supply pipes 12b and 12c and an exhaust pipe 13c.

The supply pipes 12a, 12b and 12c are each provided with temperature control means subsequently to be described. In this embodiment, the upper side and lower side of the pipe 1 are substantially individually heated, so that it is possible to heat at different temperatures the upper and lower sides of the pipe and compensate for a reduction in the radiation heat from below which is caused by the guide means 34. The insulating material layer 43 surrounds the outer tubular member 46.

Figure 4:
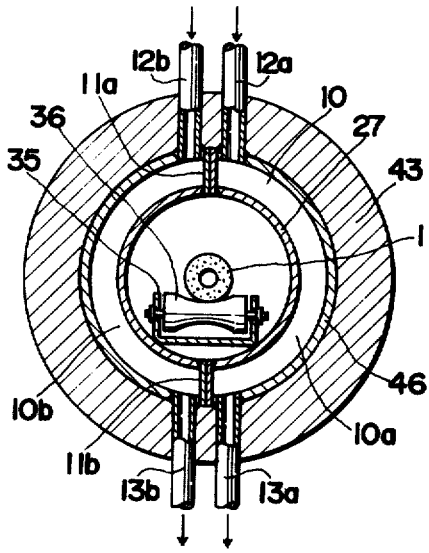

In the embodiment shown in FIG. 4, the partition walls 11a and 11b are disposed in the upper and lower portions of the heating chamber 10 so as to divide the chamber 10 into a right chamber portion 10a and a left chamber portion 10b. In other respects, the embodiment is similar to the embodiment shown in FIG. 3. This embodiment permits to compensate for a difference in temperature between the right and left portions of the pipe 1.

Figure 5:
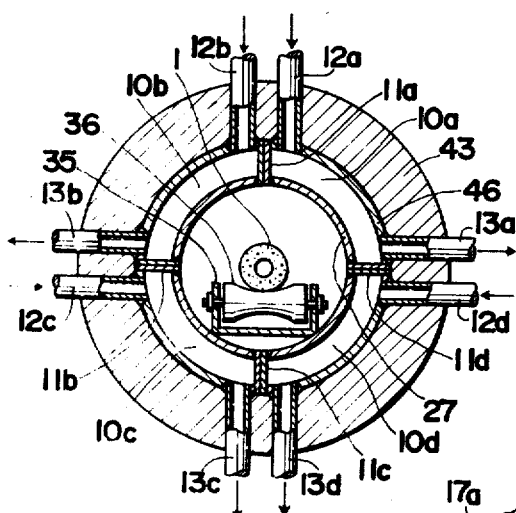

FIG. 5 shows another embodiment in which the heating chamber 10 is divided into four chamber portions 10a, 10b, 10c and 10d by four partition walls 11a, 11b, 11c and 11d. Each chamber portion has connected thereto a supply pipe 12a, 12b, 12c, or 12d and an exhaust pipe 13a, 13b, 13c or 13d. It is thus possible to effect control of the temperatures of various chamber portions 10a to 10d independently of one another.

Figure 6:
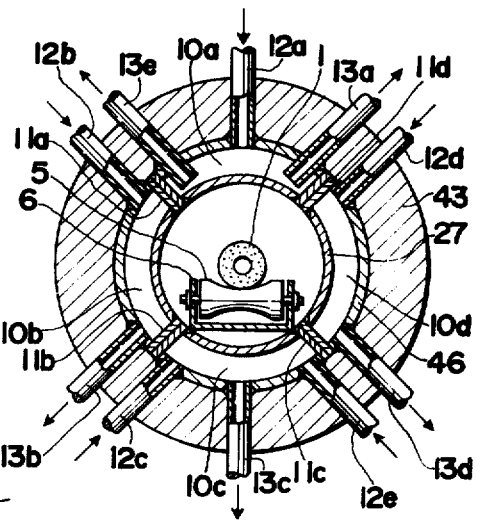

The embodiment shown in FIG. 6 is substantially similar to the embodiment shown in FIG. 5 except for the facts that the former differs from the latter in the angular position of the partition walls, and that two exhaust pipes 13a and 13e are connected to the chamber portion 10a and two supply pipes 12c and 12e are connected to the chamber portion 10c in the former.

Figure 7:
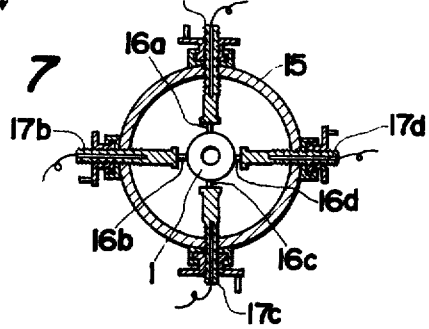
FIG. 7 is a front view of the temperature measuring means.
Figure 8:
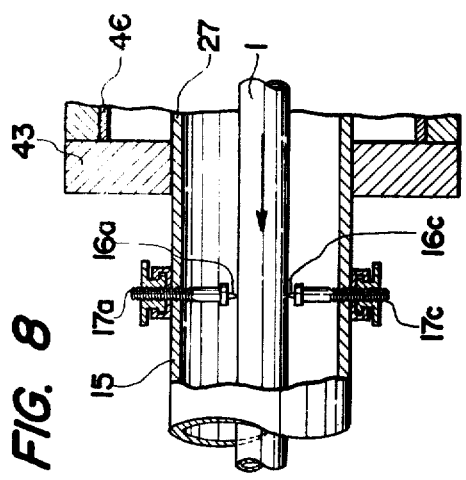
FIG. 8 is a sectional side view of FIG. 7.

FIG. 7 and FIG. 8 show one form of temperature measuring means which is particularly suitable for use with the embodiment of the apparatus shown in FIG. 6. The outlet conduit 25 of the heating apparatus is formed with a projection 15 from the inner tubular member 27, and measuring elements 17a, 17b, 17c and 17d having feeler elements 16a, 16b, 16c and 16d respectively are adjustably mounted in the projecting portion 15 in positions which are disposed equidistantly and angularly displaced from one another by 90°. The measuring elements 17a to 17d may comprise thermocouples, so that each measuring element measures the temperature of the corresponding outer peripheral portion of the circumference of the pipe 1.

Figure 9:
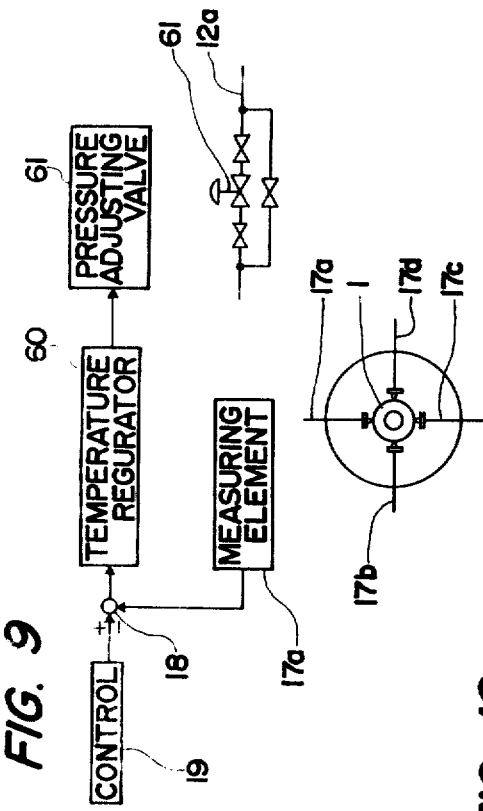
FIG. 9 is a view in explanation of one embodiment of the temperature control means.

FIG. 9 shows one form of temperature control means. A signal from a measuring element 17a, for example, is compared at a comparator 18 with a signal from a temperature setting circuit 19, and an output signal of the comparator 18 is supplied to a temperature regulator 60 so as to thereby adjust a pressure control valve 61 which is mounted in the supply pipe 12a, for example.

Thus, when the upper portion of the pipe 1 has a higher temperature than the other portions in the embodiment shown in FIG. 6, the supply pipe 12a is throttled to reduce the inflow of the heating medium into the upper chamber portion 10a so as to lower the temperature therein. The degree of opening of the supply pipe 12c or 12e is increased when the lower portion of the pipe 1 has a lower temperature so as to thereby increase the volume of the heating medium supplied thereto.

The pressure control valve 61 may also be mounted in the exhaust pipes.

EXPERIMENTAL EXAMPLE

A polypropylene homopolymer (melt index, 0.8 g/10 min.) was used as a material for the pipe 1. The pipe 1 in flat form having a major diameter of about 30 mm, a minor diameter of about 14 mm and a thickness of about 8 mm was produced by extrusion from the extruder 2. By using the heating apparatus shown in FIG. 3, steam at a temperature of 163°C was supplied to the upper chamber portion 10a while steam at a temperature of 168°C was supplied to the lower chamber portion 10b. The pipe 1 in flat form was elongated in the axial direction, and a flat bottle having a capacity of 650 cc, a length of 198 mm, a major diameter of 80 mm and a minor diameter of 64 mm was produced by blow molding from the pipe 1. When the bottle having the following thicknesses was produced by blow molding:

| | Upper side | Lower side | Left side | Right side |
|---|---|---|---|---|
| Thickness | 0.48 | 0.50 | 0.42 | 0.42 |
| | | | | (in mm) |

The bottle produced was highly transparent.

COMPARATIVE EXAMPLE

The same pipe as was produced in the above-mentioned example was made, and steam at a temperature of 165°C was supplied to both the upper and lower chamber portions 10a and 10b of the heating apparatus shown in FIG. 3. A bottle of the same size was produced by blow molding from the pipe. The bottle had the following thicknesses:

| | Upper Side | Lower Side | Left Side | Right Side |
|---|---|---|---|---|
| Thickness | 0.44 | 0.62 | 0.42 | 0.48 |
| | | | | (in mm) |

The bottle was low in transparency because the lower side thereof which had a large thickness became clouded.

Figure 11:
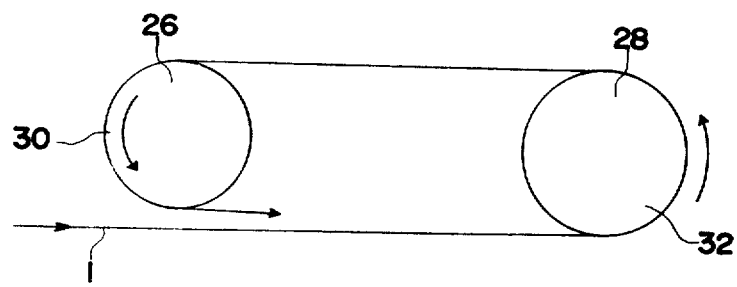

A drive mechanism for the pipe guide wheels 30 and 32 of the heating furnace will now be described. In FIG. 2 and FIG. 11, there are shown one guide wheel 30 disposed in the inlet chamber 26 and one guide wheel 32 disposed in the outlet chamber 28. When the pipe 1 is heated, the pipe 1 is moved upwardly and made to change its direction of movement by 180° by the guide wheel 32 in the outlet chamber 28 and moved downwardly and made to change its direction of movement by 180° by the guide wheel 30 in the inlet chamber 26.

Figure 10:
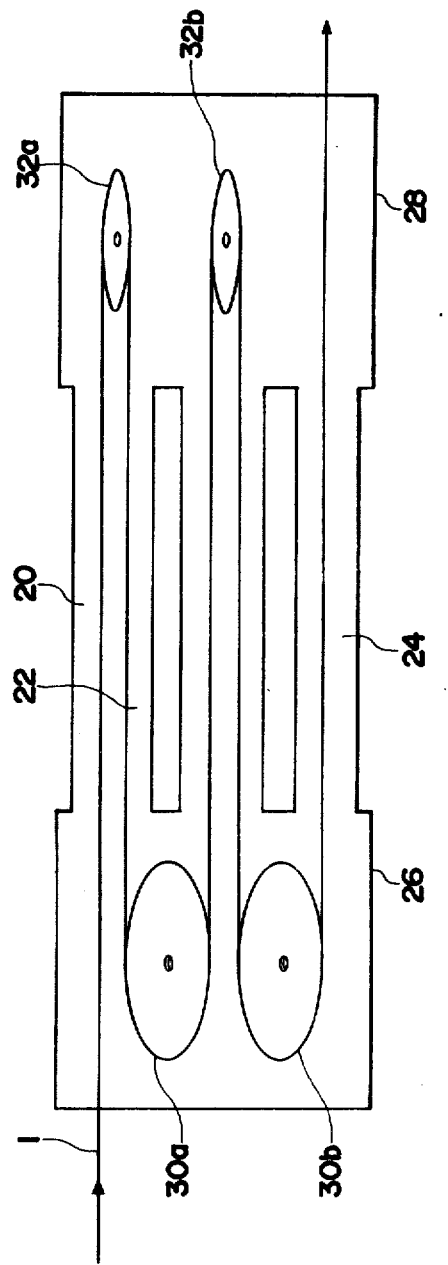
FIG. 10 and FIG. 11 are views in explanation of the arrangement of the drums in the heating furnace incorporating the invention therein.

FIG. 10 shows two guide wheels 30a and 30b in the inlet chamber 26 and two guide wheels 32a and 32b in the outlet chamber 28. In this embodiment, the guide wheels 30a and 30b disposed in the inlet chamber 26 are adapted to move the pipe downwardly while the guide wheels 32a and 32b disposed in the outlet chamber 28 are adapted to move the pipe upwardly. It is to be understood that the invention is not limited to this operation of the guide wheels 30a, 30b, 32a and 32b and that the guide wheels 30a and 30b may be made to move the pipe upwardly while the guide wheels 32a and 32b may be made to move the pipe downwardly. It is also to be understood that the rotary shafts supporting the guide wheels need not be oriented horizontally and may be slightly inclined with respect to the horizontal.

In driving the guide wheels 30a, 30b, 32a and 32b, some of the guide wheels may be forcedly driven by connecting each of them to a drive source while the other guide wheels may be driven by the tension of the pipe 1 without being connected to a drive source. Experiments were carried out in the embodiment shown in FIG. 10 by combining the two types of driving of the guide wheels. The results are shown in Table 1.

| Guide Wheel Test No. | 32a | 30a | 32b | 30b | Condition of Pipe in the Heating Furnace |
|---|---|---|---|---|---|
| 1 | | Tension Driving | | | Pipe becomes thinner |
| 2 | | Forced Driving | | | Pipe becomes loose |
| 3 | Forced | Forced | Tension | Tension | Pipe becomes thinner |
| 4 | Tension | Forced | Tension | Forced | Do |
| 5 | Forced | Tension | Forced | Tension | Stable |

As can be seen in Table 1, the best results can be achieved when the guide wheels 32a and 32b are driven by forced driving while the guide wheels 30a and 30b are driven by the pipe.

The guide wheels 30a and 30b adapted to be driven by the pipe each include a clamp ring which is turned to set the slide frictional force such that a force of 2 to 8 kg. is required to rotate the guide wheels 30a and 30b. This arrangement will be explained in detail when the construction of the connecting portion for the guide wheel is described. The guide wheels 32a and 32b adapted to be driven by forced driving are each driven by a motor.

In initiating the movement of the pipe 1 to the heating apparatus, the number of revolutions of each guide wheel is set at a level which is consistent with the rate at which the pipe is molded in a pipe molding step which precedes the pipe heating step.

When the pipe 1 moves through the heating apparatus, the temperature thereof rises. As the temperature becomes optimum for molding, the pipe 1 passing on the guide wheel 30b tends to loosen or become thinner.

If the pipe 1 does not slip relative to the rotation of the guide wheels, the pipe should loosen. Actually, however, the pipe 1 slightly slips in the former half of its path because it is at low temperature and hard. Thus, the rate at which the pipe is conveyed tends to be lower than the rate of rotation of the guide wheels. In the latter half of its path, the temperature of the pipe 1 rises and its rigidity is lowered, with a result that the pipe 1 is brought into intimate contact with the guide wheels and no slip of the pipe 1 occurs. Thus, the movement of the pipe is in synchronism with the rotation of the guide wheels.

It is not desirable that the rate of production of bottles by blow molding is varied often, because it affects the stability of blow molding of bottles and makes it impossible to produce bottles of uniform weight and quality. Thus, it is customary to produce bottles by blow molding at a uniform rate. When this is the case, loosening of the pipe caused to occur by thermal expansion is absorbed by the slipping of the pipe in the former half of its path and concentrated in the portion of the pipe around the guide wheel in the inlet chamber 26 which is disposed at the entrance to the final portion of the path of the pipe in the furnace in the latter half of its path. It will be appreciated that the phenomenon of loosening or becoming thinner of the pipe 1 can be eliminated by slightly increasing or reducing the number of revolutions of the guide wheel 32b which is forcedly driven.

Figure 12:
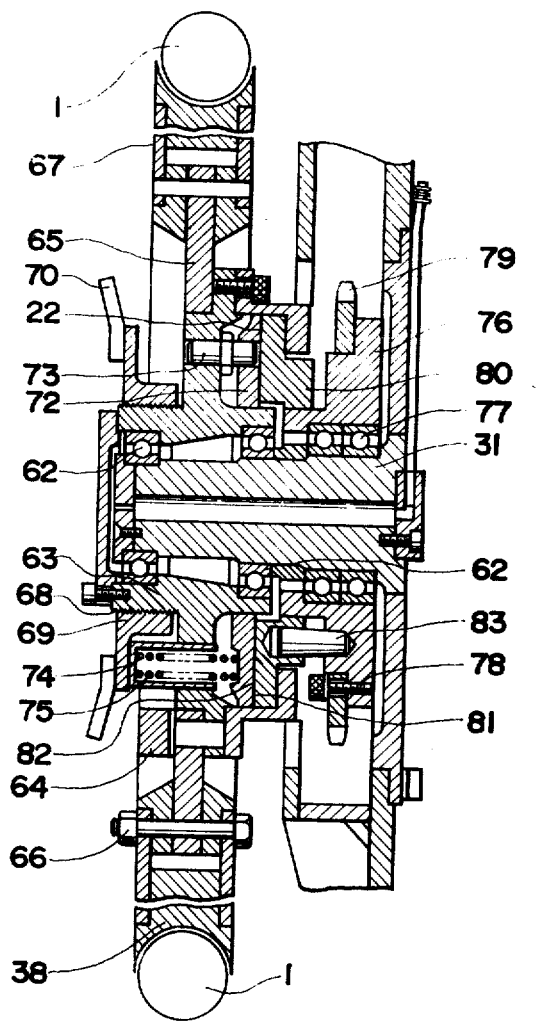
FIG. 12 is a vertical sectional view of the guide wheel showing the drum drive mechanism.

The drive mechanism of the guide wheels in concrete form will now be described in detail. Referring to FIG. 12, a drum shaft 31 connected to a fixed stay or bracket mounts thereon through a ball bearing 62 a boss 63 of the guide wheel 30a, 30b, 32a or 32b. Secured to one side of the boss 63 by bolts 64 are spokes 65 which are connected by bolts 66 to a drum 67 of the guide wheel 30a, 30b, 32a or 32b. The boss 63 includes a flange in which a threaded portion 68 is formed and a clamp ring 69 is in threadable engagement therewith. The ring 69 has a handle 70 attached thereto by suitable means.

Mounted on the other side of the boss 63 is a friction ring 72 which is connected to the boss 63 by pins 73 so that the friction ring 72 may rotate with the boss 63 as a unit. A spring box 74 is loosely fitted in the boss 63 and contains therein a spring 75 which is connected at one end to a spring rest of the friction ring 72. Thus, the friction ring 72 is normally urged by the biasing force of the spring 75 to move rightwardly in FIG. 12.

On the other hand, another boss 76 disposed adjacent the first mentioned boss 63 is rotatably supported by the shaft 31 through a ball bearing 77. A drive sprocket wheel 79 is connected to the boss 76 through bolts 78.

Mounted at one side of the boss 76 is a friction ring 80 of the drive side having an inner surface 81 which is juxtaposed against a surface 82 of the first mentioned friction ring 72. The friction ring 80 is connected to the boss 76 through parallel pins 83. It will be appreciated that, by turning the handle 70, it is possible to adjust the force with which the surface 81 of the friction ring 80 and the surface 82 of the friction ring 72 bear against each other. In the embodiment shown in FIG. 12, the handle 70, clamp ring 69 and spring 75 constitute means for adjusting the force with which the surfaces 81 and 82 bear against each other.

The operation of the drive mechanism constructed as aforementioned will now be described. The sprocket wheel 79 is rotated from a drive source (not shown) to rotate the boss 76. Rotation of the boss 76 is transmitted through the parallel pins 83 to the friction ring 80. The rotational force of the friction ring 80 is transmitted through the surface 81 thereof to the surface 82 of the friction ring 72 as a frictional force which is further transmitted through the pins 73 to the boss 63. Thus, the drum 67 is rotated through the bolts 64.

The drive mechanism operates as aforementioned when the guide wheel is operated in a normal manner. By manipulating the clamp ring 69, it is possible to freely vary the connection of the drum 67 to the sprocket wheel in such a manner that the guide wheel can be forcedly driven or rotated freely as desired. More specifically, if the handle 70 is turned to tighten the clamp ring 69 which is in threadable engagement with the threaded portion 68 of the boss 63, the clamp ring 69 will be brought into engagement with the head of the spring box 74 loosely fitted in the boss 63 and push the same rightwardly in FIG. 12, so that the spring 75 is compressed. Compression of the spring 75 brings the surface 82 of the friction ring 72 into engagement with the surface 81 of the friction ring 80 with a great force. On the other hand, if the clamp ring 69 is loosened, the compressive force of the spring 75 is reduced, so that the frictional force acting between the surface 82 of the friction ring 72 and the surface 81 of the friction ring 80 is reduced and slip occurs. The intensity of the contact frictional force can be freely adjusted by adjusting the degree of clamping of the clamp ring 69. It is thus possible to change the driving of the guide wheel from forced driving to free rotation and slip of any degree as desired can be produced.

In FIG. 13 and FIG. 14, there is shown a drive mechanism for the heating apparatus comprising three guide wheels which rotate freely in the inlet chamber 26 and three forcedly driven guide wheels in the outlet chamber 28. A drive motor 90 has a rotary shaft 91 which is connected through reduction gears 92 to a transmission shaft 93 which supports at one end thereof a sprocket wheel 94. The sprocket wheel 94 is connected through a chain 95 to sprocket wheels 96a, 96b and 96c of the guide wheels disposed in the inlet chamber 26. The sprocket wheels 96a, 96b and 96c have reducing gears 97a, 97b and 97c respectively and rotate through the chain and sprocket wheels the sprocket wheel 79 of each guide wheel shown in FIGS. 12 and 13. Thus, when no load is applied to the guide wheels, they rotate at the same rate as they are forcedly driven. However, by adjusting the frictional force acting between the surface 82 of the friction ring 72 and the surface 81 of the friction ring 80, it is possible automatically to change the rate of movement of the guide wheels in accordance with the rate of movement of the pipe and the load applied to the guide wheels when a molding operation is performed, thereby enabling to drive the guide wheels in the inlet chamber 26 by the pipe to be advanced.

On the other hand, the three guide wheels in the outlet chamber 28 are rotated by the rotational force transmitted from the rotary shaft 91 of the motor 90 to the sprocket wheel 79 of each guide wheel through speed control means 100a, 100b and 100c and transmission means 101a, 101b and 101c.

As shown in FIG. 15, the thermoplastic resinous pipe 1 according to the invention is elliptic in cross-section, for example, and formed with a hollow portion C in its central portion. As shown, the hollow portion C is circular in shape but may be elliptic in shape like the pipe itself. The pipe 1 shaped as aforementioned can be produced by using an extrusion die and a sizer which are elliptic in shape. Thus, the pipe 1 can be produced in the same manner as a circular pipe of the prior art.

The pipe 1 can be tensioned by rotating the pipe guide wheels 30a, 30b, 32a and 32b at a peripheral velocity which is slightly higher than the rate at which the pipe is extruded from the extruder 2. The pipe guide members 38 are affixed in suitable number through bolts 102 to outer periphery of the drum 67 of each guide wheel. The pipe guide members 38 are each made of Teflon or other material suitable for guiding a pipe made of a thermoplastic resinous material heated to an elongation temperature. Each guide member 38 comprises a guide surface 103 of a shape substantially similar to that of the elliptic pipe 1 for guiding the pipe moving thereon, and a pair of projections 104, 104 extending upwardly from opposite sides of the guiding surface 103 to prevent dislodging of the pipe 1 from the guide member 38.

What is claimed is:

1. An apparatus for heating a pipe made of a thermoplastic synthetic resinous material comprising a heating chamber defined between an inner tubular member and outer tubular member for heating the crystalline thermoplastic resinous pipe moving through the central portion of said inner tubular member, a plurality of partition walls extending through the entire length of said heating chamber to divide the heating chamber into a plurality of chamber portions, and a plurality of temperature measuring elements each element being mounted in one of said plurality of chamber portions and angularly displaced from one another circumferentially whereby each said temperature measuring element can effect control of the temperature in one of the chamber portions independently of one another.

2. An apparatus as claimed in claim 1 further comprising at least two pipe guide wheels disposed in an inlet chamber and an outlet chamber respectively of a heating furnace for introducing the crystalline thermoplastic resinous pipe into the heating furnace and causing the pipe to move back and forth several times in the heating furnace by changing its direction of movement, said guide wheels being forcedly driven to advance the pipe when the pipe moves upwardly from a lower run to an upper run and being driven by the moving pipe when the pipe moves downwardly from an upper run to a lower run.

3. An apparatus as claimed in claim 2 wherein said guide wheels each comprise a drum and a drive mechanism therefor, said drive mechanism comprising a drive sprocket wheel, a first friction ring adapted to rotate with said sprocket wheel as a unit, a second friction ring adapted to rotate as a unit with the drum and to be brought into frictional engagement with said first friction ring, and means for adjusting the force with which said two friction rings are brought into frictional engagement with each other.

4. An apparatus as claimed in claim 2 wherein said pipe is elliptic in cross-section, and said guide wheels are each formed therein with a guide surface which is similar in shape to the sectional shape of the pipe.

5. An apparatus as claimed in claim 3 wherein said frictional force adjusting means comprises a spring, and a clamp ring threaded into the guide wheel for pressing said spring.

6. An apparatus for heating a pipe made of a thermoplastic synthetic resinous material comprising at least two pipe guide wheels disposed in an inlet chamber and an outlet chamber respectively of a heating furnace for introducing the crystalline thermoplastic resinous pipe into the heating furnace and causing the pipe to move back and forth several times in the heating furnace by changing its direction of movement, and drive means connected to at least one of said guide wheels, said guide wheels including adjustable force transmitting friction rings for connecting said guide wheels to said drive means, said drive means and said adjustable force transmitting friction rings being operable to cause said guide wheels to forcedly advance the pipe when the pipe moves upwardly from a lower run to an upper run and to cause said guide wheels to be relatively freely driven by the moving pipe when the pipe moves downwardly from an upper run to a lower run.

7. An apparatus for heating a pipe made of a thermoplastic synthetic resinous material comprising at least two pipe guide wheels disposed in an inlet chamber and an outlet chamber respectively of a heating furnace for introducing the crystalline thermoplastic resinous pipe into the heating furnace and causing the pipe to move back and forth several times in the heating furnace by changing its direction of movement, said pipe being elliptic in cross-section, and said guide wheels including a plurality of guide members for receiving said elliptic pipe and being affixed to the peripheral surface of said guide wheels, said guide members including a curved guide surface of a shape substantially similar to that of the elliptic pipe for supporting said pipe and a pair of projections extending upwardly from opposite sides of the guide surface and having planar surfaces, said projections to prevent dislodging of the pipe from the guide member.

* * * * *